March 17, 1959 R. B. CORBETT ET AL 2,878,007
ROTARY HEATING DEVICE
Filed July 8, 1955 3 Sheets-Sheet 1

INVENTORS.
Robert B. Corbett &
Walter J. O'Connor.
BY Hoopes, Leonard & Buell
THEIR ATTORNEYS.

March 17, 1959

R. B. CORBETT ET AL 2,878,007

ROTARY HEATING DEVICE

Filed July 8, 1955

INVENTORS.
Robert B. Corbett &
Walter J. O'Connor.

BY Hoopes, Leonard & Buell

THEIR ATTORNEYS.

INVENTORS.
Robert B. Corbett &
Walter J. O'Connor.
BY Hoopes Leonard & Buell

THEIR ATTORNEYS

United States Patent Office 2,878,007
Patented Mar. 17, 1959

2,878,007

ROTARY HEATING DEVICE

Robert B. Corbett, Greensburg, and Walter J. O'Connor, Grove City, Pa., assignors, by mesne assignments, to Arcweld Manufacturing Company, Grove City, Pa., a corporation of Pennsylvania Application July 8, 1955, Serial No. 520,817

7 Claims. (Cl. 266—2)

This invention relates to a rotary heating device having a plurality of movably mounted furnaces. More particularly, this invention pertains to such a new device especially useful in cooperation with, for example, one or more testing machines for testing specimens heated in such furnaces.

Before testing material like metal in a high-temperature test or the like, it is the practice to heat the specimen to be subjected to the test to that stable temperature at which the test is to be conducted on that specimen. Heretofore, such heating has been performed with the specimen in testing position which, in a conventional tension testing machine, is between the columns of that machine. Generally, such a high-temperature tension test is performable in a relatively short period of time. However, the time required to heat the specimen is often much longer and the testing machine by that practice is occupied in the case of each test for a length of time constituting the actual testing period and the longer period required to heat the specimen to test temperature and to equalize the temperature before tension is applied to the specimen. Consequently, a laboratory having to make a number of high-temperature tension tests in a given period of time often required the purchase of additional tension testing machines because of immobilization of them during the heating and temperature stabilization of the specimen. Moreover, if a second high-temperature tension test were scheduled to follow the completion of a prior, the heating furnace employed between the columns might have to be replaced if the second test were to be performed at a lower temperature than the temperature of the furnace used in heating the immediately prior test specimen, resulting in additional nonproductive time for that particular testing machine and often for its accessory equipment such as a commonly included extensometer.

The instant invention resolves the difficulties, delays and economic loss of such prior practices and the use of our new rotary heating device provides temperature rise to test temperature and equalization at that test temperature before the heated test specimen is placed within the grips of the testing machine. Thereby, testing machines are enabled to perform such high-temperature tension tests, for example, one right after the other by means of the new device. Other objects and advantages will be apparent from the following description and the accompanying drawings, which are illustrative only, in which Figure 1 is a view in elevation of one embodiment of our new rotary heating device suitable for individual heating of, for example, a plurality of test specimens for high-temperature tension tests or the like;

Figures 1, 2:
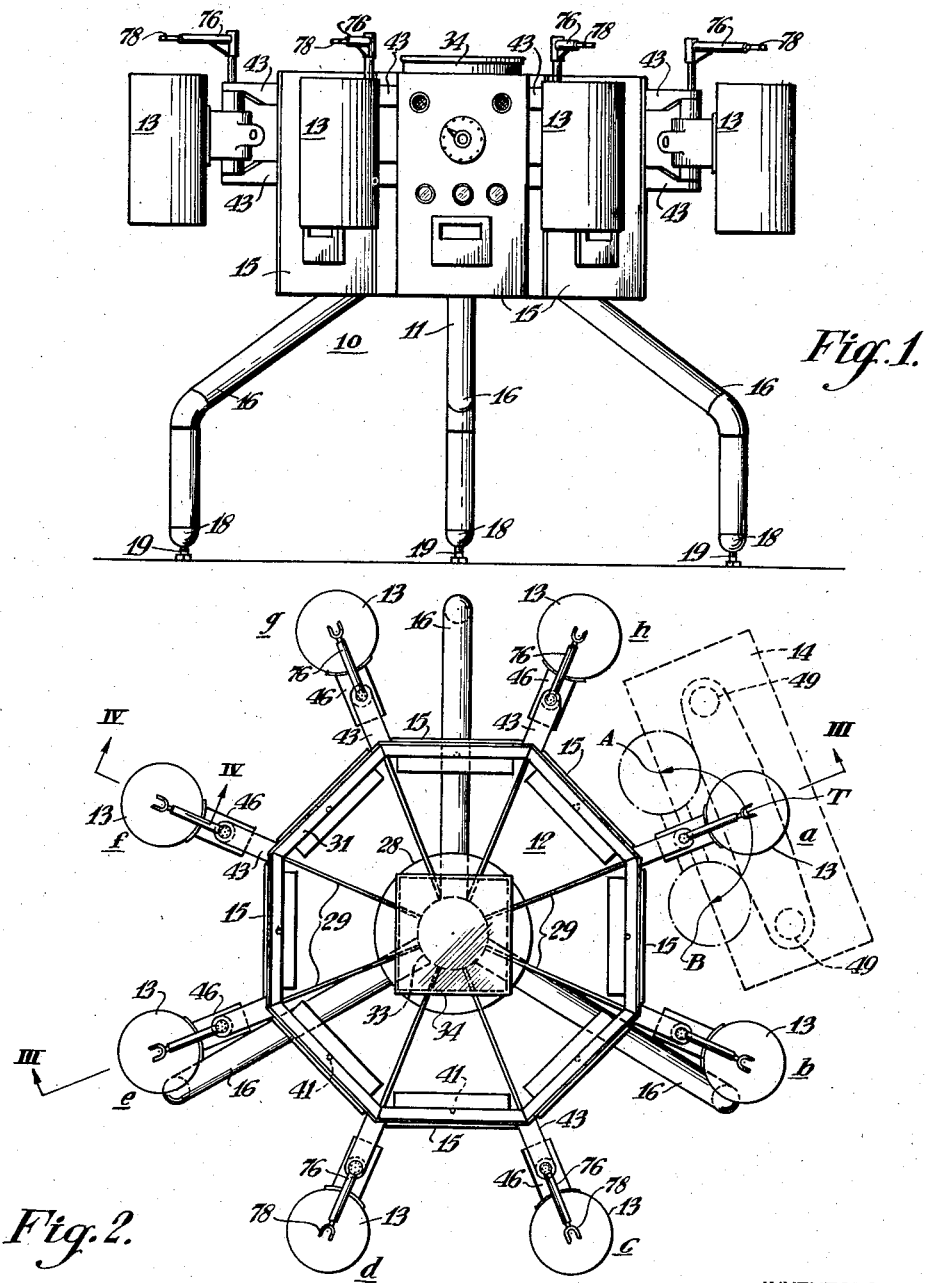
Figure 2 is a view in plan of the new rotary heating device shown in Figure 1 with the furnaces thereof in the same relative position including one in position for the testing of the heated specimen therein.

Referring to the drawings, there is illustrated therein one embodiment 10 of our invention, suitable for utilization, for example, in high-temperature tension testing or like cooperation with one or more testing or other machines requiring individual heating of objects to be treated thereby. Embodiment 10 includes a stand 11 in which a frame 12, which may be octagonal as shown, is rotatably mounted. In turn, a plurality of individual furnaces 13 are swingably supported by frame 12 so as to extend outwardly therefrom in spaced circumferential relation to one another and in cooperative relation to a machine which may be a tension testing machine 14 positioned adjacent the new device 10. Each furnace 13 may be individually controlled by instrumentation and electrical equipment mounted on a panel control 15 fastened to frame 12 adjoining the respective furnace controlled by it. In the illustrated embodiment, the faces of panels 15 substantially completely cover the flat vertical exterior portions of frame 12 between the generally radially extending supports for the furnaces 13.

Figure 3:
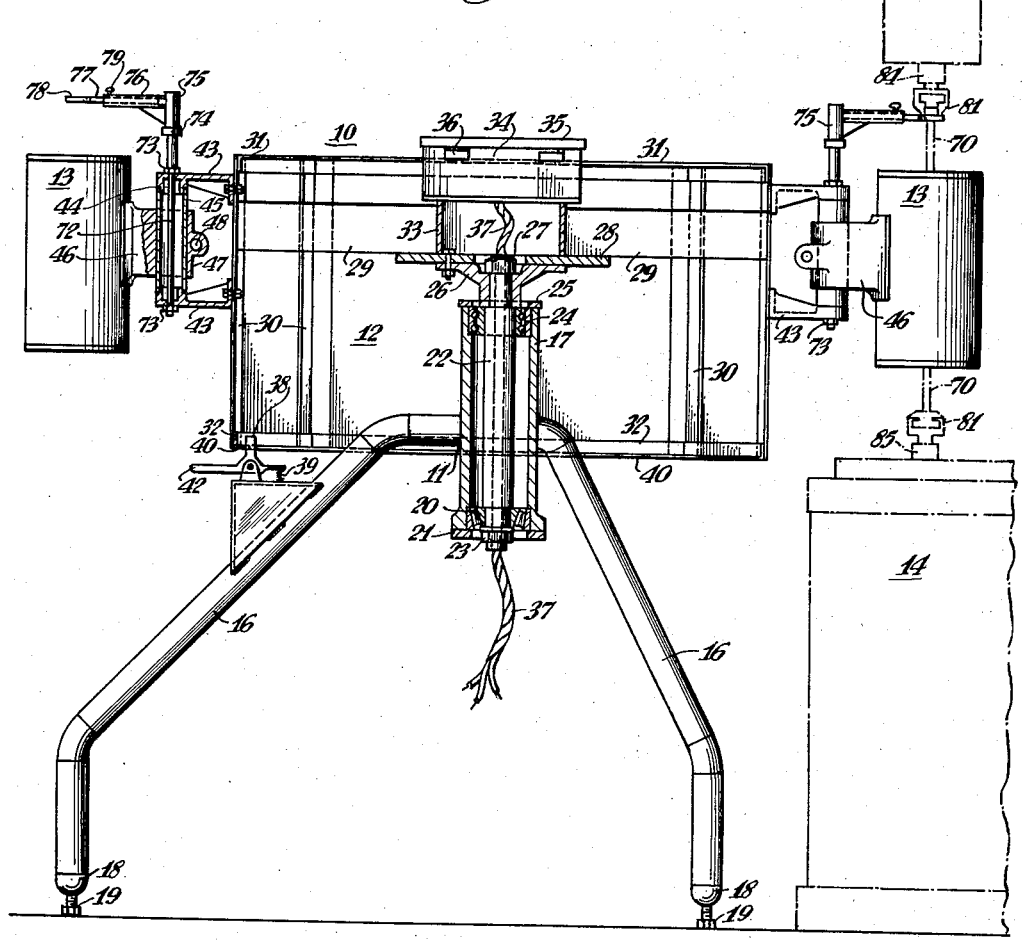
Figure 3 is a view partly in section taken along line III—III of Figure 2.

Stand 11 may readily be constructed with tripod pipe legs 16 welded at their upper ends to a leg ring cylinder 17 which may also serve as a bearing housing for frame 12. The lowermost ends 18 of leg 16 may be drilled and have a nut affixed thereto in registry with the drilled opening for the receipt of a leveling bolt foot 19 to regulate height or to compensate for any unevenness in the floor of a laboratory or plant where device 10 may be installed. Cylinder 17 may be provided at the lower end thereof with a thrust bearing 20 retained in place by an annular retainer plate 21 bolted to the lower end of cylinder 17. The opening through the inner race of bearing 20 has a necked portion of a hollow spindle 22 passing therethrough, the spindle 22 being axially secured by a nut 23 engaging the threaded portion of the necked portion of spindle 22 as shown in Figure 3. The axis of spindle 22 is maintained vertical by a second bearing 24 retained in place in cylinder 17 by a second retainer plate 25 fastened to cylinder 17.

A pedestal 26 engages spindle 22 as shown and is secured thereto axially by a nut 27 engaging the upper threaded end of spindle 22. An annular strut flange 28 is bolted to rotatable pedestal 26 and in turn has radially extending struts 29 welded thereto. The outer ends of struts 29 are welded to vertically extending structural corner members 30. The tops and bottoms of the eight corner members 30 are in turn welded to structural angles 31 and 32 to complete the boxlike peripheral skeleton of frame 12 which extends below the struts 29 in the manner of a skirt member.

The inner ends of the struts 29 are also welded to a strut ring 33. Ring 33 is also welded to flange 28 and the upper edge of ring 33 is fastened to a junction box 34 having a removable cover 35 and eight slots 36 around the periphery of box 34. Insulated power cables 37 may be connected to suitable terminals in junction box 34 and pass downwardly through the bottom thereof and through the hollow center of spindle 22 to power connections in the floor of the laboratory or the plant beneath device 10.

One of the legs 16, which may be the leg at the top of

Figure 2, may be provided with a latch 38 pivotally connected to that leg 16 and biased by a spring 39 to press against the inwardly extending horizontal flanges 40 of the angles 32. In each testing position of frame 12 and device 10 relative to a testing machine, like machine 14, the flanges 40 are notched as shown by the dotted outline 41 in Figure 2 so that spring 39 causes latch 38 to engage notch 41 and hold frame 12 against rotary movement until handle 42 is lifted enabling frame 12 to be rotated to the next test station thereof with a new furnace 13 and specimen in testing position cooperation with machine 14. Where the flanges 40 abut at the corners of frame 12, a curved guide member may be employed, if required, so that the biased latch 38 will slide past such corners until it reaches the next latching notch 41. In the event that frame 12 is to be rotated two stations to bring the next specimen to be tested in to testing position cooperation relative to machine 14, then handle 42 is lifted as the intermediate notch 41 goes by so that the frame 12 will not automatically be stopped thereat. In the illustrated embodiment of device 10, the rotation of frame 12 and of furnaces 13 from one station to the next selected station, which usually is but need not be the next furnace, is accomplished manually but semiautomatic or automatic provision may readily be made for that purpose as will be understood by those to whom this invention is disclosed.

To each corner member 30 a pair of support bar brackets 43 are fastened, as shown in Figure 3, with the outer ends thereof in opposed relation and having facing shouldered portions 44 to serve as bearing surfaces for a hollow support bar 45 to which furnaces 13 are respectively fastened for swiveling action about the axis of the support bar 45. Swivel brackets 46 are fastened to each furnace 13 and also surround the respective support bar 45. Swivel brackets 46 are longitudinally split at the inner ends 47 thereof and the sides adjustably joined by a bolt 48 which when loosened permits the swivel bracket 46 and thereby the furnace 13 to be vertically adjusted up and down over the length of support bar 45. At the height selected for furnace 13, bolt 48 is tightened and furnace 13 remains at such height while at the same time being swingable through an arc having its ends approximately represented by the dotted line positions A and B for the furnace nearest test machine 14, such arc sweeping outwardly of the axis of support bar 45 through the test position T thereof when that furnace station is cooperating with machine 14. The ability of each furnace 13 to swivel about the axis of support bar 45 enables a furnace 13 having a specimen at equalized test temperature to pass by whichever of the columns 49 in machine 14 may be nearer whereupon that furnace with its specimen ready for testing can then be swung to test position corresponding to position T between the columns 49 and the high-temperature tension test run on the specimen in a relatively short time whereupon the furnace can be swung again so as to pass by the approaching column 49 to enable frame 12 in device 10 to swing the next ready furnace into cooperative testing position relative to machine 14.

Figure 4:
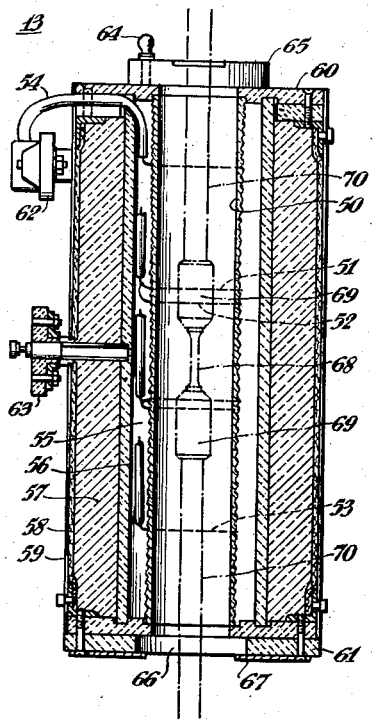
Figure 4 is a view taken along line IV—IV of Figure 2 to show in detail a preferred form of furnace which may be embodied in our new rotary heating device.
Figure 5:
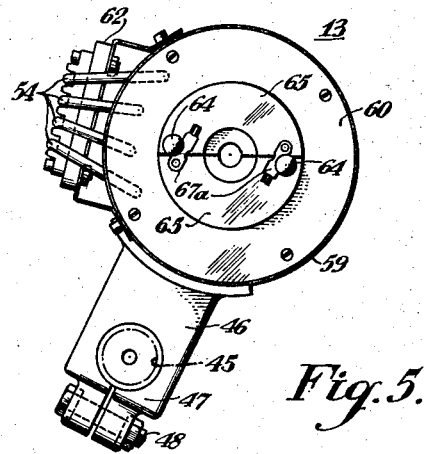
Figure 5 is a view in plan of such preferred furnace element and a member to hold a specimen while it is being heated in such furnace.
Figure 7:
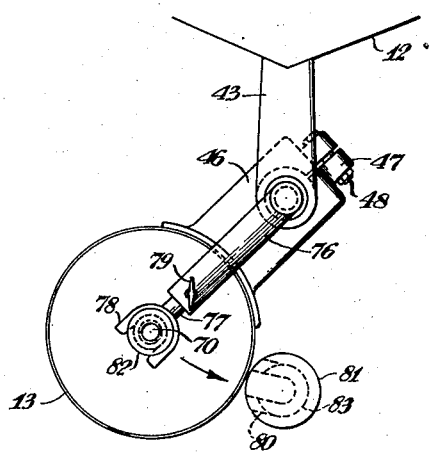
Figure 7 is a view in plan of the members shown in Figure 6.

A preferred form of furnace is shown in Figures 4 and 5 and may comprise a hollow "Alundum" alumina core 50 having spiral corrugations on the outer surface thereof for the seating of three spiral nichrome wire heating coils 51, 52 and 53 approximately around the top, middle and bottom of core 50, the respective leads 54 from the respective coils passing upwardly through an annular air space 55 inside a second "Alundum" alumina tube 56. Tube 56 is in turn concentrically spaced relative to further insulation 57 nside an insulating cylinder 58 and a shell 59 which may be of stanless steel. Top and bottom annular covers 60 and 61 with suitable spacers are connected to shell 59 which also supports a terminal plate 62 for the ends of the respective leads 54. In addition, provision is made for thermocouple terminals 63 utilized in achieving proper control of the respective furnace 13.

Door posts 64 are provided on the top cover and are adapted to act as pivots for the swinging of the respective halves of insulated top door 65. Top door halves 65 are held closed by engagement of the catches 67a as shown with the respective door post 64 for the other door half. The semi-circular annular halves of bottom door 66, on the other hand, are held in place by the horizontally swingable halves of a door plate 67. As shown in Figure 4 particularly, a specimen 68 to be tested may be threaded for engagement by or may otherwise be secured to a specimen holder grip 69 at each of the ends thereof. The upper and lower holders in turn are secured to an upper and lower grip bar 70 which terminates in a self-aligning specimen grip cap 71. The grip caps 71 are adapted to engage and be engaged by grip sockets 81 fastened to the upper and lower heads of a machine like testing machine 14.

In the illustrated embodiment, there are eight furnace 13 stations which in Figure 2 for illustrative purposes have been lettered as stations a to h, inclusive and respectively, such stations corresponding to positions in space. As shown, stations b to h, inclusive, are utilizable as heating stations, both to raise a specimen to be tested to testing temperature and to equalize or stabilize that specimen at that temperature preparatory to such testing at station a. A respective furnace 13 at station a is in testing cooperation relation to machine 14 when it is in radial position marked by the letter T after having been swung aside somewhere along the arc A–B in order to clear one or the other of the columns 49 to allow that furnace 13 to be swung into position T at station a for testing of the specimen therein when at testing temperature. Such a furnace 13 is swiveled aside again as it leaves such station a.

Moreover, each of the stations b to h, inclusive, can also serve as a station at which a tested specimen may be removed and a new one inserted. For such removal and insertion, the catches 67a are released and the halves of top door 65 are swung open on door posts 64 removing them from the sides of upper grip bar 70. Similarly, the halves of door plate 67 are swung open and the halves of bottom door 66 thus move away from the sides of the lower grip bar 70. Thereupon, the broken halves of the specimen already tested are removed from the upper and lower grip holders 69 and a new specimen put in place whereupon the new specimen ready for heating and the grip holder, bars and caps are lowered into the empty furnace center through the top to the position generally shown in Figure 4 at which time the top and bottom doors 65 and 66 are reclosed and held there by catches 67a and plate 67, respectively.

Figure 6:
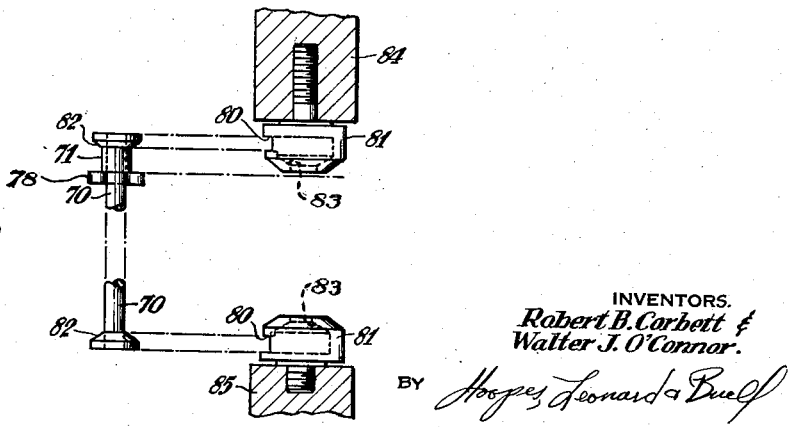
Figure 6 is a view in elevation of one form of testing machine grip sockets in reception position for a specimen which has been heated and transported by our new device.

The outer ends of support bar brackets 43 are drilled for the passage of a tie rod 72 which is threaded at appropriate places for engagement by the nuts 73 to fasten it in place and hold the outer ends of the brackets 43 in secured relation to support bar 45. The upper end of rod 72 may be of greater diameter and be engaged by a collar 74 adjustably secured thereto at an appropriate height. A fork sleeve 75 surrounds the upper end of rod 72 and rests against the upper side of collar 74. Hollow fork arm 76 extends outwardly and receives the tang 77 of a fork 78. A thumb screw 79 passes through arm 76 to adjustably engage the tang of fork 78. Fork 78, as also illustrated in Figure 6, supports the underside of upper grip cap 71 at the predetermined level suitable for registry with openings 80 of the upper and lower self-aligning grip sockets 81 of machine 14 when, as shown in the drawings, those respective grip caps are swung into testing position at station a. When in testing position, the bevel surfaces 82 in the grip caps align themselves with the corresponding seating and self-aligning bevel surfaces 83 in the grip sockets 81 respectively connected to the upper and lower heads 84 and 85 of test machine 14. The lower cylindrical part of the upper cap 71 is high enough to enable fork 78 to pass beneath the bottom of upper grip socket 81, as shown in Figure 6 whereupon, if desired, thumb screw 79 may be unscrewed and tang 77 pushed back into arm 76 far enough to remove fork 78 from any supporting relation relative to the underside of the upper grip cap 71 which it had been supporting prior to that time. On the other hand, in a testing machine in which upper grip socket rises during testing, fork 78 may remain in place and will not hinder the testing.

The openings 80 of the grip sockets 81 are preferably so faced that the swiveling of the respective furnace 13 moving into testing position cooperation station $a$ after it has passed into the center space between columns 49 will move the upper and lower grip caps 71 into the upper and lower grip sockets 81 as that furnace 13 is swung into position T. During the heating stage and such swinging or swiveling of that furnace 13, the upper and lower doors 65 and 66 are sufficiently close to the grip bars 70 that the specimen will stay relatively concentric in the interior of the furnace. Moreover, swinging of any furnace 13 will swing its supporting fork 78 if in engagement with the grip for a test specimen in that furnace. Hence, a high-temperature tensile test can be run on any newly inserted and heated specimen in a relatively short period of time without otherwise tying up the time of the testing machine used.

Each furnace 13 is individually controlled by means of the instrumentation and electrical equipment preferably mounted as a unit on its respective panel 15. That temperature regulation and control is impressed upon the furnace by suitable circuit connections to the respective panel 15 and from thence to the respective terminals 62 and 63, as will be understood by those skilled in the art to whom this invention is disclosed and such may be carried out in a variety of circuit arrangements. Each of the panels 15 is bolted in proper position, adjoining the appropriate side of the respective furnace 13 which it controls, to the corner members 30 and the top and bottom angle members 31 and 32, the depth of the equipment on each panel 15 being schematically represented by the box outline 86, the wire leads from which pass through one of the respective slots 36 into junction box 34 for the energization of them under the controls incorporated within each panel 15. When the front of the panel units 15 are secured in position to the boxlike peripheral skeleton of frame 12, the rotatable member of our device 10 is substantially completely enclosed, as shown in Figure 1.

Moreover, in the illustrated embodiment, positive terminal connections are used for the different current carrying circuit wires, rather than having any slip or collector ring circuit arrangements. Such means that if the power cables 37 to junction box 34 are in untwisted relation when the new device 10 is in the position shown in Figure 2, any rotation thereof either clockwise or counterclockwise through the respective stations should not exceed 315° before beginning to rotate the new device in the opposite direction. Of course, if a collector or slip ring arrangement is incorporated in connection with the power cables 37, below device 10 or in junction box 34, then the new device 10 can continue to be rotated in the same direction as long as may be desired and through as many revolutions as may be desired. Our new device, moreover, is flexible not only in that the insertion of the heating of new specimens to be tested and the removal of tested specimens can take place in stations $b$ to $h$, inclusive, away from the test machine 14, but also in that with individual control of the temperature of respective furnaces 13, it is not necessary to wait until a furnace cools down since in the number of individual furnaces provided at least one will almost always be certain to have a temperature which is not above the test temperature to which it is desired to raise the specimen being newly inserted. Still further, although but a single testing machine 14 is shown in the illustration herein as combinatively cooperating with our new device 10, it is evident that more than one such testing machine may be used in cooperation with one of our new devices with achievement of the advantages described above.

Although the illustrated embodiment has been described in connection particularly with high-temperature tension test utilizations, it will be understood that the new rotary heating device is susceptible of far wider application not only in other kinds of testing, such as compression testing, but also in other activities.

Various modifications may be made in elements and details of this invention without departing from the spirit thereof or the scope of the appended claims.

We claim:

1. In combination, a rotary heating device having a stand, bearing means supported by said stand, a hollow spindle rotatably supported by said bearing means, a pedestal connected to said spindle, outwardly extending circumferentially spaced struts connected to said pedestal for rotation therewith, boxlike skeletal rotatable frame members secured to said struts, radially extending support brackets connected to the periphery of said frame members in peripherally spaced relation to one another, furnaces swivelly supported by said support brackets and adapted to be swung to reduce the distance between the axis of said spindle and of said furnace at the time being, a testing mechine having a testing position between columns reachable by swiveling a furnace moving into said testing position away from its radially outermost position until said furnace is between said columns, respective panel control means for individually heating each of said furnaces, each of said control means being mounted on said frame adjoining its respective furnaces, power means for said control means extending through the interior of said spindle, adjustable fork means swingably mounted above said furnace and adapted to support a specimen to be heated in said furnace, means for moving each of said furnaces to different stations around the axis of said spindle, and latch means for holding said frame at any such station.

2. In combination, a rotary heating device having a stand, bearing means supported by said stand, a spindle rotatably supported by said bearing means, outwardly extending circumferentially spaced struts connected to said spindle for rotation therewith, frame members secured to said struts, outwardly extending support brackets conected to the periphery of said frame members in circumferentially spaced relation to one another, furnaces supported by said support brackets and adapted to be swung arcuately to reduce the distance between the axis of said spindle and of said furnace, a testing machine having a testing position reachable by moving a furnace towards the axis of said spindle until said furnace is in the immediate vicinity of said testing position, means for heating said furnaces, adjustable means adapted to support an object in a furnace for the heating thereof prior to reaching said testing position, and means for moving each of said furnaces to selected stations around the axis of said spindle.

3. In combination, a rotary heating device having a rotatable frame, a plurality of furnaces swingably supported by said frame, a machine having a cooperation position for at least one of said furnaces reachable by swinging such furnace into said position when near said machine, means for heating respective objects in said furnaces when said furnaces are not in said position, means for supporting said object during heating in said furnaces, and means for transferring the support of each object moved into said position to said machine.

4. In combination, in a rotary heating device, a nonrotating stand, radially extending arms rotatably supported by said stand, a structural frame connected to said arms for rotation therewith, radially extending support brackets connected to the periphery of said frame in horizontally spaced relation to one another, tubular furnaces adjustably and swingably supported on said support brackets and adapted to have the distance between each of said furnaces and said frame varied by means of such swinging at an appropriate time, unit furnace temperature controlling means for each of said furnaces removably mounted on said frame adjoining its respective furnace, adjustable means removably and swingably mounted above each of said furnaces to support an object therein to undergo heating to an individually selected temperature, and means for holding said frame in any selected position of rotation.

5. In combination, in a rotary heating device, a nonrotating stand, a frame rotatably supported in said stand, outwardly extending support brackets connected to the periphery of said frame in horizontally spaced relation to one another, furnaces movably supported on said support brackets and adapted to have the distance between each of said furnaces and said frame varied by means of such movement, furnace temperature controlling means mounted on said frame, and means adjacent each of said furnaces to support an object to undergo heating therein.

6. In combination, in a rotary temperature control device having a stand, bearing means supported by said stand, a rotatable frame having a vertical axis and supported by said bearing means for rotation substantially in a single plane about said axis, outwardly projecting support brackets connected to the periphery of said frame in peripherally spaced relation to one another around the periphery of said frame, temperature control enclosures movably supported by said support brackets each about an axis generally parallel to said axis of said frame to change the distance between the axis of said frame and the interior of said enclosures, and means connected to said frame adjacent the outside of each of said enclosures to support specimens in the interiors thereof.

7. In an object conditioning device, in combination, a base, a frame supported on said base and movable in an endless path substantially in a single plane, a plurality of object-receiving units, said units being mounted on said frame in outwardly extending arrangement around said frame for movement in said endless path, means for moving said units relative to said frame to change the distance between said units respectively and said frame, and means for respectively supporting objects received by said units.

References Cited in the file of this patent

UNITED STATES PATENTS

| | | |
|---|---|---|
| 1,716,796 | Rockwell | June 11, 1929 |
| 2,404,584 | Liska et al. | July 23, 1946 |
| 2,467,129 | Huber | Apr. 12, 1949 |
| 2,721,734 | Grunewald et al. | Oct. 25, 1955 |
| 2,729,967 | Kaufmann et al. | Jan. 10, 1956 |

OTHER REFERENCES

Mesures et Controls Industriel, vol. 19, No. 200, pp. 31–32, Feb. 26, 1954.

UNITED STATES PATENT OFFICE

CERTIFICATE OF CORRECTION

Patent No. 2,878,007                                                      March 17, 1959

Robert B. Corbett et al.

It is hereby certified that error appears in the printed specification of the above numbered patent requiring correction and that the said Letters Patent should read as corrected below.

Column 3, line 17, for "in to" read -- into --; line 70, for "nside" read -- inside --; line 71, for "stanless" read -- stainless --; column 8, line 31, list of references cited, under the heading "OTHER REFERENCES", for "Feb. 26, 1954" read -- January, 1954 --.

Signed and sealed this 28th day of July 1959.

(SEAL)
Attest:

KARL H. AXLINE                                                    ROBERT C. WATSON

Attesting Officer                                                 Commissioner of Patents